(12) United States Patent
Pfitzer et al.

(10) Patent No.: US 11,904,944 B2
(45) Date of Patent: Feb. 20, 2024

(54) FRONT WALL MODULE

(71) Applicant: Bayerische Motoren Werke Aktiengesellschaft, Munich (DE)

(72) Inventors: Hanno Pfitzer, Furth (DE); Rudolf Schilling, Ergolding (DE); Manuel Schurz, Landshut (DE); Jean-Marc Segaud, Landshut (DE); Thomas Wolff, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 287 days.

(21) Appl. No.: 17/293,217

(22) PCT Filed: Oct. 1, 2019

(86) PCT No.: PCT/EP2019/076504
§ 371 (c)(1),
(2) Date: May 12, 2021

(87) PCT Pub. No.: WO2020/099021
PCT Pub. Date: May 22, 2020

(65) Prior Publication Data
US 2021/0380172 A1 Dec. 9, 2021

(30) Foreign Application Priority Data
Nov. 13, 2018 (DE) ............ 10 2018 128 404.7

(51) Int. Cl.
*B62D 21/15* (2006.01)
*B62D 25/14* (2006.01)
(Continued)

(52) U.S. Cl.
CPC ............ *B62D 21/152* (2013.01); *B60K 35/00* (2013.01); *B62D 25/14* (2013.01); *B62D 29/004* (2013.01); *B62D 29/008* (2013.01)

(58) Field of Classification Search
CPC ...... B62D 21/15; B62D 25/14; B62D 29/004; B62D 29/008; B60K 35/00
(Continued)

(56) References Cited

U.S. PATENT DOCUMENTS 5,580,122 A 12/1996 Muehlhausen
6,270,152 B1 8/2001 Sato
(Continued)

FOREIGN PATENT DOCUMENTS

CN 1720154 A 1/2006
CN 101628564 B 6/2014
(Continued)

OTHER PUBLICATIONS

PCT/EP2019/076504, International Search Report dated Jan. 13, 2020 (Two (2) pages).
(Continued)

*Primary Examiner* — Amy R Weisberg
*Assistant Examiner* — Dana D Ivey
(74) *Attorney, Agent, or Firm* — Crowell & Moring LLP

(57) ABSTRACT

A front wall module for delimiting a front of a passenger cell in a motor vehicle includes a planar carrier structure which forms a front wall portion where a functional shape for receiving a component is formed in the planar carrier structure and where the planar carrier structure is a cast aluminum structural part.

8 Claims, 1 Drawing Sheet

(51) Int. Cl.
 *B62D 29/00* (2006.01)
 *B60K 35/00* (2006.01)
(58) Field of Classification Search
 USPC .................................................. 296/187.09
 See application file for complete search history.

(56) References Cited

U.S. PATENT DOCUMENTS

| | | | |
|---|---|---|---|
| 7,546,893 B2* | 6/2009 | Rahmstorf | B62D 29/008 |
| | | | 296/192 |
| 2006/0145506 A1 | 7/2006 | Braun et al. | |
| 2009/0315343 A1 | 12/2009 | Gonin | |
| 2011/0193332 A1* | 8/2011 | Mildner | B62D 25/088 |
| | | | 280/781 |

FOREIGN PATENT DOCUMENTS

| | | | |
|---|---|---|---|
| CN | 206358221 U | 7/2017 | |
| DE | 44 09 081 C1 | 4/1995 | |
| DE | 44 30 920 C1 | 3/1996 | |
| DE | 198 13 092 A1 | 9/1999 | |
| DE | 198 27 749 A1 | 12/1999 | |
| DE | 102 20 025 A1 | 11/2003 | |
| DE | 10 2004 032 949 A1 | 1/2006 | |
| DE | 600 25 098 T2 | 9/2006 | |
| DE | 10 2009 006 960 A1 | 8/2010 | |
| DE | 102009006960 A1 * | 8/2010 | ........... B62D 25/145 |
| WO | WO 2004/050409 A1 | 6/2004 | |
| WO | WO 2018/055515 A1 | 3/2018 | |

OTHER PUBLICATIONS

German Search Report issued in German application No. 10 2018 128 404.7 dated Oct. 16, 2019, with Statement of Relevancy (Eight (8) pages).

Chinese Office Action issued in Chinese application No. 201980059743.7 dated Jul. 28, 2022, with English translation (Seventeen (17) pages).

* cited by examiner

FRONT WALL MODULE

BACKGROUND AND SUMMARY OF THE INVENTION

The invention relates to a front wall module for delimiting the front of a passenger cell in a motor vehicle.

The passenger cell of a motor vehicle is, as seen in the direction of travel, partitioned off at the front by a so-called firewall or front wall. Such front walls are typically produced from shaped sheet metal parts which are connected at their upper end to a hollow support which is arranged above the front wall and constitutes the lower connection surface for a wind shield of the motor vehicle. Such a design offers the advantage that the vehicle body can be prefabricated in a substantially liquid-tight manner and with a stiff structure.

Within the context of functional integration, it is already known to use front wall modules which, in addition to the function of the front wall, perform still further functions. Thus, for example, document DE 44 09 081 C1 shows a composite structural part having a front wall portion into which there are integrated further functional shapes which serve to receive additional components, such as a pedal system or washer-fluid reservoir. A front wall module of the type in question is also known from DE 10 2009 006 960 A1, with it being the case here that functions of the instrument panel support are combined with the function of the front wall.

Against this background, it is the object of the invention to specify an improved front wall module which, in particular in combination with low weight, offers improved installation space utilization and has an advantageous accident behavior.

A front wall module is specified for delimiting the front of a passenger cell in a motor vehicle, having a planar carrier structure which forms at least one front wall portion and in which at least one functional shape for receiving an additional component is formed. According to the invention, there is now provision that the carrier structure is a cast aluminum structural part. By contrast with steel, aluminum has a lower specific weight but a high stiffness. There can be produced a particularly lightweight and at the same time highly stiff structural part which can be used in a targeted manner for stiffening the vehicle body.

The production of the aluminum structural part as a cast structural part makes it possible here to achieve a high degree of flexibility in terms of the structural part shape than is provided for example with shaped sheet metal parts. There can for example be realized greater structural part depths, different wall thicknesses or else cavities, thereby opening up new scope in terms of the integration of additional functions or vehicle components into the front wall module and making it possible to utilize installation space in the vehicle in another way.

The carrier structure can be formed for example as a diecast aluminum structural part. Where mention is made of an aluminum structural part, it is also intended for structural parts made of an aluminum alloy to fall under this term. In one embodiment, a particularly lightweight structural part can be achieved by virtue of the metal structural part being a foamed cast aluminum structural part. Here, the aluminum is present with a multiplicity of enclosed gas bubbles.

The front wall module is connected to the vehicle body via attachment points. The points of attachment to the vehicle body are formed in the carrier structure and, between the attachment points, the carrier structure is preferably formed in a load path-compatible manner with respect to the expected structural part loading. Expressed in other words, the carrier structure can for example form a skeleton-like structure by means of which the mechanical requirements placed on the front wall are met. The carrier structure bears the mechanical loads in a loading situation. The incorporation of a load path-compatible cast aluminum structural part into the front wall region of a vehicle body can contribute to stiffening the overall vehicle body.

In one embodiment, the carrier structure has greater wall thicknesses in portions of high expected structural part loading than in portions of low expected structural part loading. This can be implemented without problem in a casting method and makes it possible in a simple manner to realize the load path-compatible design. With different walls thicknesses, it is also possible to implement additional functions in the carrier structure. For example, the wall thickness of the carrier structure in the region of the foot lever mechanism can be thickened in such a way that the carrier structure can perform the function of a bearing block for the foot lever mechanism.

Furthermore, the use of a cast structural part also makes it possible to form rib structures as reinforcement without problem. In one embodiment, the carrier structure therefore has reinforcing ribs. They can be formed in particular in portions of high expected structural part loading. When casting the carrier structure, these reinforcing ribs are directly cast on concomitantly, with the result that loading-compatible reinforcements can be formed in the front wall module without additional process steps.

In a preferred embodiment, the carrier structure has a peripheral flange for attaching to the vehicle body, that is to say that the front wall module is incorporated at the peripheral flange into the vehicle body, for example via spot welds or adhesive bonds. Such a front wall module can preferably be used in vehicle bodies designed in a frame construction and forms a planar stiffening of the front vehicle body section. At the top, the flange is attached to a crossmember, at the sides to the A-pillars and at the bottom to the floor pan of the vehicle body.

Within the context of lightweight construction, it can be advantageous if the front wall module is a hybrid front wall module and at least one plastics body is injection-molded onto the carrier structure. The metal fraction in the front wall module can be reduced to a minimum and the weight further decreased. Since the carrier structure is built up in a load path-compatible manner, the plastic does not have to absorb crash-relevant forces and can correspond or be configured to be thin, as a result of which the weight of the front wall module is further reduced. The injection-molding of a plastics body dispenses furthermore with assembly steps and tolerances. This can occur in a known manner in the injection-molding method, with it being possible for the plastics material used to be thermoplastics with or without fiber reinforcement. The overmolding with plastic can then for example be configured in such a way that sealing of the front wall with respect to the passenger cell is ensured.

In one embodiment, the plastics body is formed as foamed plastic. This achieves higher acoustic insulation than solid plastic, making it possible to dispense with additional acoustic insulating materials. Rather, the function of the acoustic insulation can be fulfilled by the plastics body.

Since the carrier structure is formed by a casting method, greater structural part depths can be realized than is possible with shaped sheet metal parts. It is therefore possible, in one embodiment, for functional shapes to be integrated into the carrier structure to receive additional components. These functional shapes can for example form a receptacle for a headup display, for parts of an air-conditioning system or further components. The functional shape can be configured in such a way that it is adapted in its shape to the additional component to be received. For example, all portions of the metal body can form a "pot" or a container for the additional component into which the latter can be inserted or pushed.

It is also possible, in one embodiment, for functional shapes to be integrated into the plastics body, or the plastics body can form a functional shape. The functional shape can serve to receive additional components; for example, a glovebox can be directly molded onto the metal body, or a supporting structure for bearing the instrument panel. The injection-molding also allows high degrees of freedom with regard to the shaping of these functional shapes.

In particular by virtue of the formation of the carrier structure as a cast aluminum structural part in combination with the integration of functional shapes into the carrier structure or the plastics body, functions can be performed by the front wall module that have up until now been performed by separate structural parts:

For instance, in one embodiment, a bearing block for the foot lever mechanism is integrated into the carrier structure. In the region of the bearing block, this purpose can be served for example by increasing the wall thickness of the carrier structure.

In a further preferred embodiment, the carrier structure or the at least one plastics body, or both the carrier structure and the plastics body, is/are configured in such a way that it/they performs/perform the function of an instrument panel support. Expressed in other words, the front wall module is configured in such a way that the instrument panel can be directly fastened and supported by the front wall module.

The integration of the bearing block and of the instrument panel support makes it possible to dispense with the need to manufacture individual structural parts of the front wall, of the instrument panel support or support tube and of the bearing block. Moreover, assembly steps for assembling the individual components can be saved.

Further advantages, features and details of the invention will emerge from the following description in which exemplary embodiments of the invention are described in detail with reference to the drawings. Here, the features mentioned in the claims and in the description may be essential to the invention in each case individually per se or in any desired combination. Where use is made in this application of the term "can", this represents not only the technical possibility but also the actual technical implementation.

Exemplary embodiments will be explained below on the basis of the attached drawings.

DETAILED DESCRIPTION OF THE DRAWINGS

Figure 1:
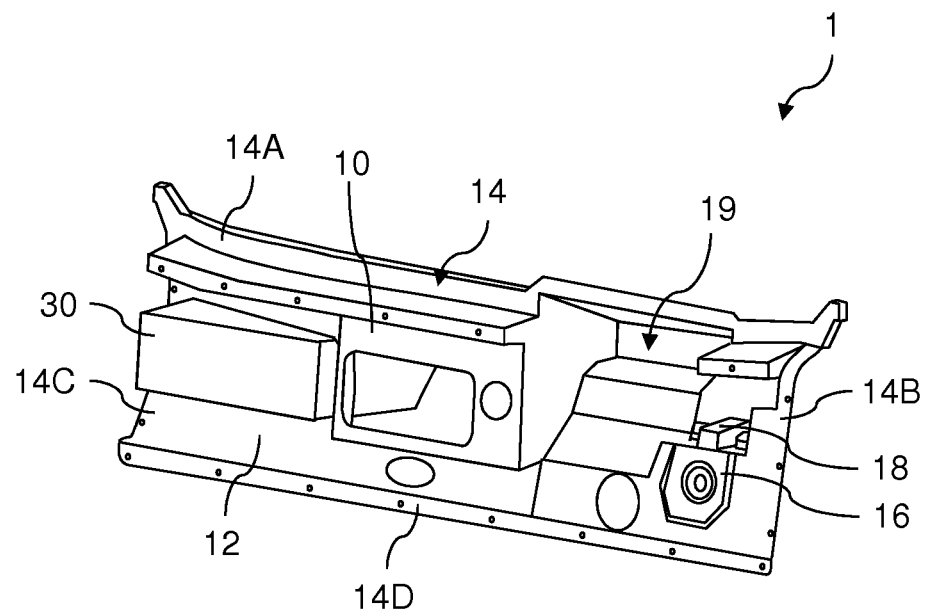
FIG. 1 shows a front view of an exemplary front wall module.
Figure 2:
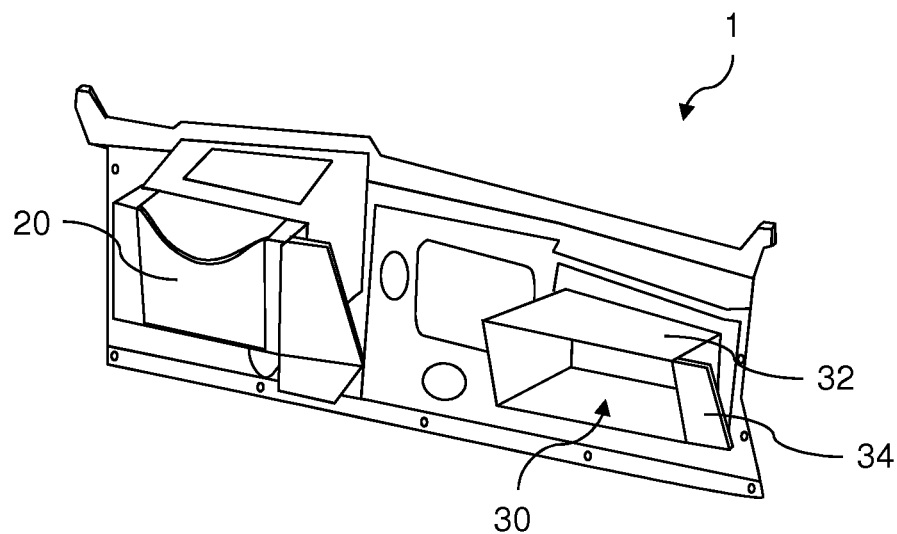
FIG. 2 shows a rear view of the front wall module from FIG. 1.

FIG. 1 is a schematic illustration showing a front view of an exemplary front wall module 1. Here, the front view shows that side which faces toward the vehicle front in the installed state. FIG. 2 correspondingly shows a schematic rear view of the front wall module 1 shown in FIG. 1.

The front wall module 1 is formed with a hybrid design and has a carrier structure 10 in the form of a cast aluminum structural part, and also two plastics bodies 20, 30 injection-molded onto the carrier structure 10. The number of the plastics bodies is purely by way of example. there can also be provided only a single plastics body or more than two plastics bodies.

The front wall module 1 serves for installation in a passenger motor vehicle, with a front wall portion 12 delimiting the passenger compartment toward the front.

The carrier structure 10 extends over the entire width and height of the front wall module 1 and has a peripheral flange 14. It is at the flange where the attachment to the vehicle body occurs, with the upper flange 14A being attached to a crossmember, the lateral flanges 14B, 14C to the A-pillars and the lower flange 14D to the floor pan.

The carrier structure 10 is formed as a cast aluminum structural part. It is thereby possible to provide a portion 16 of increased wall thickness in the region of the brake booster, and also to integrate into the carrier structure 10 a bearing block 18 which serves for receiving a foot lever mechanism.

The carrier structure 10 has furthermore a functional shape 19 in the form of a pot-shaped depression in which there can subsequently be received a headup display unit. Such deep formations can be produced without problem in the cast carrier structure and would not be able to be realized with a deep-drawn sheet metal structural part.

On the rear side of the front wall module 1, a first plastics body 20 is injection-molded onto the carrier structure 10. The plastics body 20 forms a functional shape in the form of a supporting structure for the instrument panel of the vehicle. For additional acoustic insulation, the plastics body 20 can be formed for example as a foamed plastics body. On the front passenger side there is injection-molded a further plastics body 30 which, by way of a main body 32, forms a glovebox as functional shape. Projecting laterally away from the main body there is arranged a web 34 which forms a supporting structure for the instrument panel.

The front wall module 1 thus performs functions of the instrument panel support or tube and of the bearing block for the foot lever mechanism. This dispenses with assembly steps and the production of individual structural parts of the front wall, of the instrument panel support and of the bearing block of the foot lever mechanism.

LIST OF REFERENCE CHARACTERS

1 Front wall module
10 Carrier structure
12 Front wall portion
14 Peripheral flange
14A, B, C, D Flanges
16 Portion
18 Bearing block of foot lever mechanism
19 Functional shape
20 Plastics body
30 Plastics body
32 Main body
34 Web

What is claimed is:

1. A front wall module for delimiting a front of a passenger cell in a motor vehicle, comprising:
    a planar carrier structure which forms a front wall portion, wherein a first functional shape for receiving a first component is formed in the planar carrier structure and wherein the planar carrier structure is a cast aluminum structural part;
    wherein a plastics body is injection-molded onto the planar carrier structure;

wherein the plastics body is formed from foamed plastic and is acoustic insulation;

wherein a second functional shape is integrated into the plastics body for receiving a second component or wherein the plastics body forms a second functional shape for receiving a second component.

2. The front wall module according to claim 1, wherein the planar carrier structure is a foamed cast aluminum structural part.

3. The front wall module according to claim 1, wherein the planar carrier structure has respective greater wall thicknesses in portions of high expected structural part loading than in portions of low expected structural part loading.

4. The front wall module according to claim 1, wherein the planar carrier structure has reinforcing ribs.

5. The front wall module according to claim 1, wherein the planar carrier structure has a peripheral flange for attaching to a body of the motor vehicle.

6. The front wall module according to claim 1, wherein a bearing block for a foot lever mechanism is integrated into the planar carrier structure.

7. The front wall module according to claim 1, wherein the planar carrier structure and/or the plastics body is configured such that the front wall module performs a function of an instrument panel support.

8. A method of forming a front wall module that delimits a front of a passenger cell in a motor vehicle, comprising the step of:

forming a planar carrier structure by a casting method, wherein a functional shape for receiving a component is formed in the planar carrier structure and wherein the planar carrier structure is aluminum; and injection-molding a plastics body onto the planar carrier structure;

wherein the plastics body is formed from foamed plastic and is acoustic insulation;

wherein a second functional shape is integrated into the plastics body for receiving a second component or wherein the plastics body forms a second functional shape for receiving a second component.

\* \* \* \* \*